April 7, 1959      T. A. WISEMAN      2,880,813
DISK ATTACHMENT FOR A PLOW

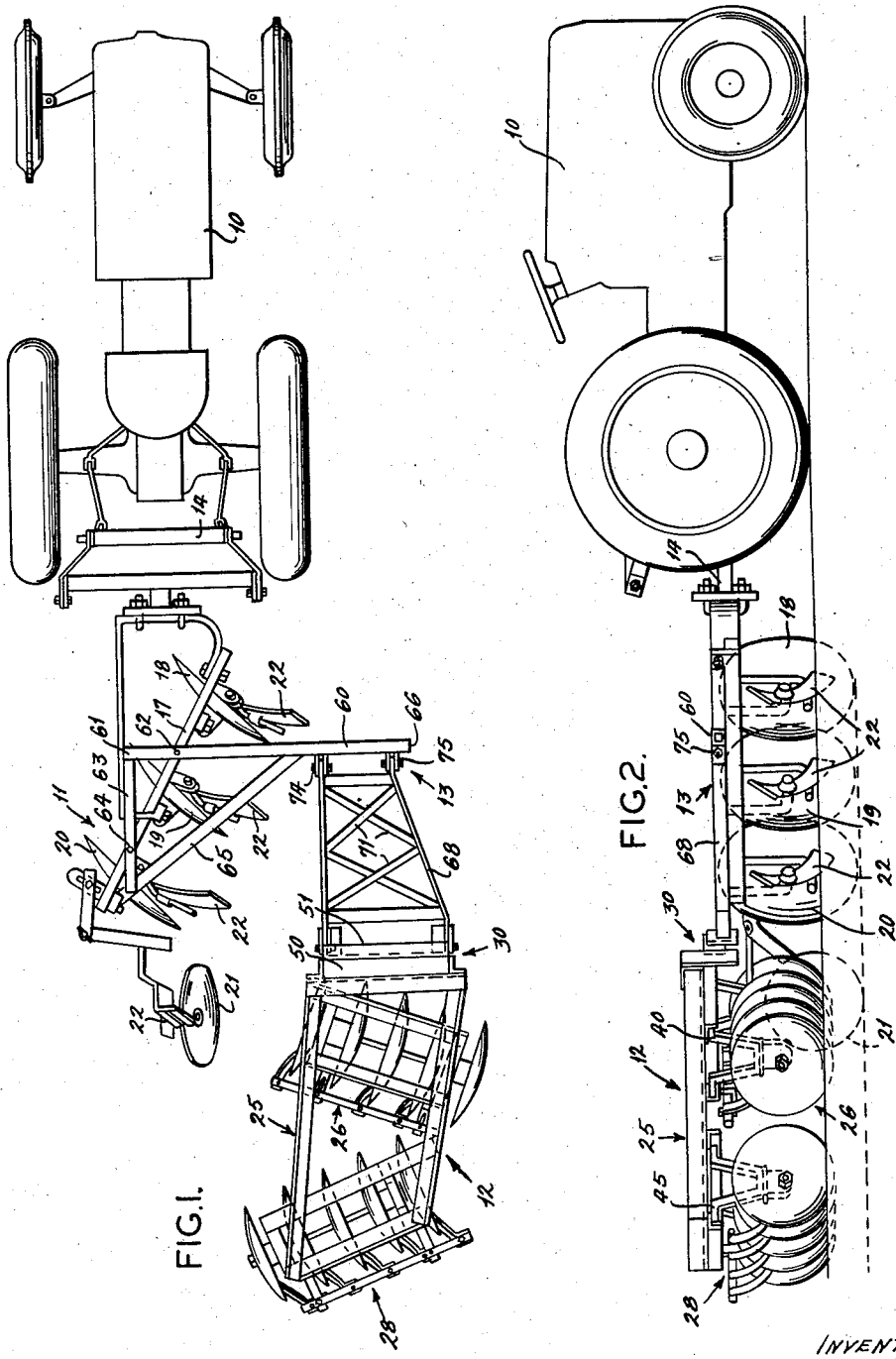

Filed Jan. 31, 1955      2 Sheets-Sheet 2

INVENTOR:
THOMAS A. WISEMAN
By Gravely, Lieder, Woodruff & Wills
ATTORNEYS.

United States Patent Office 2,880,813
Patented Apr. 7, 1959

2,880,813

DISK ATTACHMENT FOR A PLOW

Thomas A. Wiseman, Tullahoma, Tenn.

Application January 31, 1955, Serial No. 485,101

2 Claims. (Cl. 172—583)

This invention relates to agricultural implements, and more particularly to a novel disk attachment for a plow.

It is an object of this invention to provide a disk attachment for simultaneous use with a plow in the preparation of farm land for planting whereby one operation with a conventional disk harrow is eliminated.

Another object is to provide a disk attachment having an offset tandem arrangement of reversely acting disks that will pulverize soil as it is turned by a plow thereby conditioning it for maximum moisture retention, and which will laterally displace the freshly worked soil leaving a level surface.

Another object of this invention is to provide a hitch for connecting a disk attachment to a plow whereby side draft forces, which are normally exerted by a disk harrow on the prime mover, will be reduced to a minimum.

Another object is to provide a hitch arrangement for connecting a disk attachment securely to a plow whereby the penetration of the disks is controlled and yet the disk attachment is permitted to vertically adjust itself to compensate for rocks or the like without affecting the operation of the plow.

Another object is to provide a hitch for hingedly connecting a disk attachment to a plow, the hitch permitting transverse leveling of the disk attachment relative to ground but maintaining the disk attachment in fixed transverse position during operation.

Another object of this invention is to provide a novel disk attachment that is inexpensive, efficient and durable, and which may be quickly attached to any type of plow.

These and other objects and advantages will become apparent hereinafter.

The invention is embodied in a disk attachment having a plurality of disks arranged in tandem gangs obliquely set relative to the path of travel, and mounted under a suitable frame. The invention is further embodied in a hitch arrangement for securing the disk attachment to a plow; and in the combination of the disk attachment and hitch with the plow.

Figure 3:
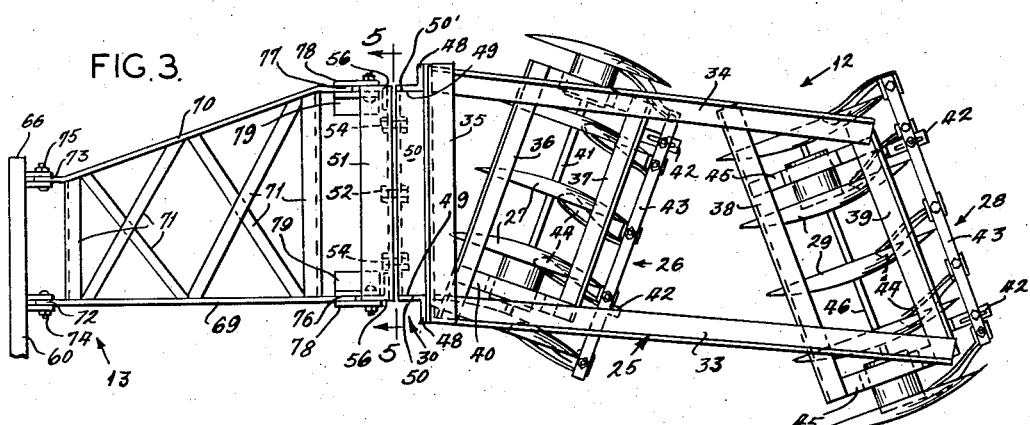
Figure 4:
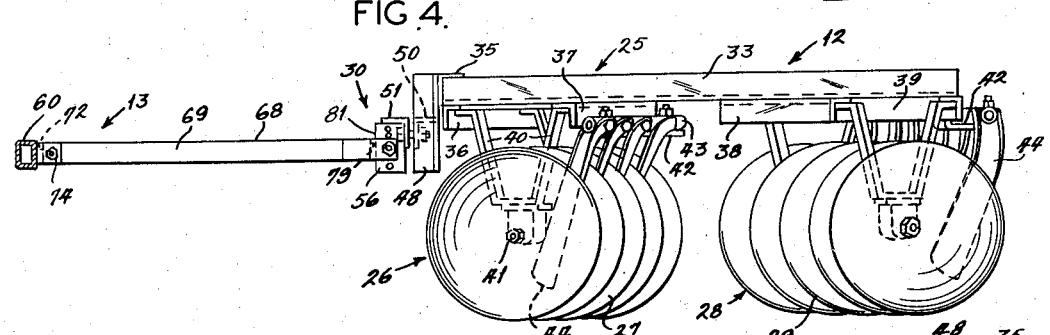
Figure 5:
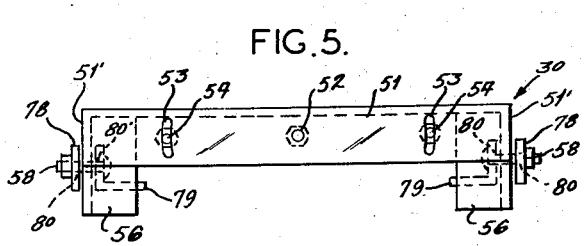
Figure 6:
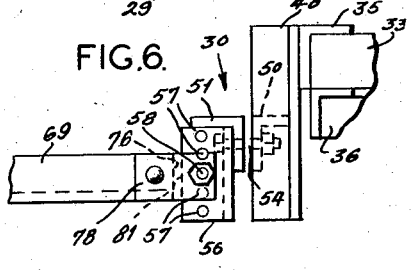

The invention also consists in the parts and in the arrangements of parts hereinafter described and claimed. In the accompanying drawings which form a part of this specification and wherein like numerals refer to like parts wherever they occur:

Fig. 1 is a top plan view of a disk attachment secured by a hitch arrangement to a plow, which is connected to a prime mover, Fig. 2 is a side elevational view of the disk attachment, hitch, plow and prime mover shown in Fig. 1, Fig. 3 is an enlarged top plan view showing the details of the disk attachment and the hitch arrangement, Fig. 4 is an enlarged side elevational view showing the details of the disk attachment and hitch shown in Fig. 3, Fig. 5 is a transverse elevational view of the hitch connector taken along line 5—5 of Fig. 3, and Fig. 6 is an enlarged fragmentary elevational view showing the hitch connector.

In the following description, the words "land side" and "left" are used to refer to the side of the prime mover, plow or disk attachment which is directed toward unplowed ground. The words "furrow side" and "right" are used to refer to the side of the prime mover, plow, or disk attachment opposite to the land side.

Referring to Figs. 1 and 2 of the drawings, it will be seen that a towing vehicle 10, such as a tractor, is provided as a prime mover for a conventional plow 11 and a disk attachment 12, which is connected to the plow 11 by a hitch 13. The plow 11 may be connected to the tractor 10 by a conventional hydraulic lifting apparatus 14 so that the plow 11 may be raised relative to the ground to control its penetration therein or to prevent any penetration whatsoever, as when moving the implement to or from an area to be plowed. The plow 11 has a longitudinal beam or support 17 angularly positioned relative to the path of movement of the prime mover 10, and three adjustable spaced disk blades 18, 19 and 20 are rotatably secured thereto. A ground wheel 21 is also provided rearwardly of the rear disk blade 20 to cooperate with the lifting mechanism 14 in controlling the penetration of the disk blades into the ground. Conventional scraper elements 22 are adjustably positioned adjacent each of the disk blades 18, 19 and 20 and the ground wheel 21 to prevent the accumulation of earth thereon. It is to be understood that a tractor and a three-disk plow have been shown merely for the purposes of illustration and that the disk attachment 12 is adaptable for use and in combination with any type of plow and prime mover.

The disk attachment 12, Figs. 3 and 4, includes a main frame 25, a forward gang frame 26 carrying a plurality of front disks 27, a rearward gang frame 28 carrying a plurality of rear disks 29, and a hitch connector 30.

The main frame 25 has a land side longitudinal frame member 33 and a furrow side longitudinal frame member 34 that are interconnected at their front ends by a transverse angle bar or frame member 35. The side members or bars 33 and 34 are rigidly held in substantially parallel spaced relation by the transverse bar 35 and by forward and rear angle bars 36 and 37 of the front gang frame 26, and forward and rear angle bars 38 and 39 of the rear gang frame 28, the rear angle bar 39 interconnecting the rear ends of the side members 33 and 34. The transverse bar 35 and the angle bar 36, 37, 38 and 39 may be secured to the side members 33 and 34 in any suitable manner, such as by welding, to provide a rigid construction.

The front angle bar 36 of the front gang 26 has its left end secured to the frame 25 adjacent the juncture of the land side frame member 33 and the transverse frame member 35, the front and rear angle bars 36 and 37 of the front gang of disks 26 extending rearwardly toward the furrow side frame member 34 in spaced parallel relation to define an angular relationship with the normal path traveled by the disk attachment 12 when in operation. A hanger 40 is positioned adjacent to each of the side frame members 33 and 34 of the main frame 25 and extends between the front and rear angle bars 36 and 37. Each of the hangers 40 is substantially perpendicular to the angle bars 36 and 37 and is secured in depending relationship thereto. Journaled in the hangers 40 is a front axle or shaft 41 having the front disks 27 mounted thereon. The rear angle bar 37 has rearwardly extending spaced brackets 42 mounted thereon, the brackets 42 providing a means for securing a disk cleaning tool having a central mounting rod 43 and a plurality of spaced blades 44 equal to the number of disks 27 provided in the front gang 26. Each of the blades 44 curves forwardly and downwardly from the rod 43 to adjacent one of the front disks 27 and is adjustable relative thereto for scraping or knocking loose any earth clinging to the disks 27 during the plowing operation.

As previously described, the rear angle bar 39 of the rear gang 28 interconnects the rear ends of the side frame members 33 and 34. The front and rear angle bars 38 and 39 are spaced apart and parallel and angle forwardly from the land side frame member 33 to the furrow side frame member 34 so that a V-shaped structure is defined by the front and rear gangs 26 and 28, which opens toward the land side of the disk attachment 12. A hanger 45 is positioned adjacent to each of the side frame members 33 and 34 and extends between the front and rear angle bars 38 and 39. Each of the hangers 45 is substantially perpendicular to the angle bars 36 and 37 and is secured in depending relationship thereto. A rear axle or shaft 46 is journaled in the hangers 45, the disks 29 in the rear gang 28 being mounted in spaced relation on the shaft 46. The rear gang 28 also has a disk cleaning tool mounted to the rear angle bar 39 in the same manner as described for the front gang 26. It is now apparent that the rear gang 28 is obliquely disposed relative to the path of movement of the disk attachment 12 and to the front gang 26. In addition, the disks 27 in the front gang 26 are concavely dished toward the land side of the disk attachment 12, and the disks 29 in the rear gang 28 are concavely dished toward the furrow side of the disk attachment 12 so that the front gang 26 will cause lateral soil displacement toward the land side and the rear gang will cause lateral soil displacement in the opposite direction. Furthermore, the outside disk 29 on the land side if offset to the left of the end disk 27 of the front gang 26 in order to substantially replace any earth displaced to the left by the front gang, the rear gang 28 thereby filling the furrow made by the outside disk 27 on the furrow side of the disk attachment 12 and leaving the ground substantially level.

The hitch connector 30 is mounted on the front of the main frame 25 to provide an adjustable attachment means for fastening the hitch 13 thereto. As best shown in Figs. 3, 4 and 5, a vertically positioned angle bar 48 may be secured to each of the front corners of the main frame 25 to provide abutment surfaces 49 for the hitch connector 30 below the upper level of the disk attachment 12 so that the disk attachment may be pulled from near its center of weight. The hitch connector 30 comprises a rear cross bar 50 having ends 50' positioned adjacent to the abutment surfaces 49 of the vertical bars 48 and secured thereto by welding or other suitable means. A front cross bar 51 having ends 51' is positioned adjacent to the rear cross bar 50 and pivotally secured thereto by a pin 52, the pin 52 being positioned at the center of the cross bars 50 and 51. An arcuate slot 53 may be formed in each of the cross bars 50 and 51 intermediate the pivot pin 52 and each of the ends 50' and 51', respectively. The slots 53 in the rear cross bar 50 register with the slots 53 in the front cross bar 51 so that a bolt 54 may be positioned adjacent to each end of the cross bars 50 and 51 to prevent relative movement therebetween when the disk attachment 12 is in operation. When the bolts 54 are loosened, the main frame 25 may be pivoted on the pin 52 relative to the hitch 13 thereby permitting the disk attachment 12 to be leveled so that the disks 27 and 29 will evenly penetrate the earth. After the main frame 25 has been leveled, the bolts may be tightened so that no transverse pivotal or rocking movement will take place when the disk attachment is in operation. In addition, the hitch connector has a vertical plate 56 secured to each end 51' of the cross bar 51 with a plurality of openings 57 formed therein. The openings 57 are vertically aligned and adapted to receive a bolt 58 or the like for hingedly securing the hitch 13 to the plates 56.

The hitch 13 for connecting the disk attachment 12 to the plow 11 comprises a longitudinal beam or connecting member 60 having a left end 61 and which may be rigidly secured to the longitudinal support 17 of the plow 11 as at 62 in any suitable manner, see Fig. 1. Preferably, a brace 63 is secured at right angles to the left end 61 of the beam 60, the brace 63 extending rearwardly therefrom and crossing the diagonally extending longitudinal support 17. The brace 63 may be fastened to the support 17 as at 64, and a cross brace 65 may be fastened between the rearward end of the brace 63 and the beam 60. It is apparent that this arrangement makes the right end 66 of the beam 60 completely rigid and movable only with the plow 11. The beam 60 is shown to extend outwardly from the plow 11 at substantially right angles to the path of movement of the prime mover 10; however, because of the adaptability of the disk attachment 12 to any type of plow 11, it may be more effective to secure the beam 60 to extend away from the plow 11 in the direction of dirt displacement by the disks or moldboard of the plow.

The hitch 13 also comprises a truss or tongue 68 for connecting the beam 60 to the hitch connector 30. The truss 68 has a longitudinal left side-piece 69 and a longitudinal right side-piece 70, which are spaced by a lacing of angle bars 71 to form a rigid structure. The side-pieces 69 and 70 have forward ends 72 and 73 connected to the beam 60 by hinges 74 and 75, and rearward ends 76 and 77. The hinges 74 and 75 are adjacent the right end 66 of the beam 60, and the ends 72 and 73 are spaced from the beam 60 so that unrestricted pivotal movement of the truss 68 relative to the beam 60 will be permitted. Each of the rearward ends 76 and 77 of the side-pieces 69 and 70 respectively may be provided with a slotted extension, which is preferably constructed of plates 78 and 79 rigidly secured to the side surfaces of the side-pieces by welding or other suitable means. The plates 78 and 79 are spaced apart by each of the side-pieces 69 and 70 a predetermined distance thereby permitting the vertical plates 56 to be positioned therebetween. The unattached end of each of the plates 78 and 79 has an opening 80 formed therein through which the bolt 58 may pass to hingedly connect the side-pieces 69 and 70 to the vertical plates 56, Figs. 5 and 6. However, each of the vertical plates 56 has a front edge or abutment 81, which is spaced from the rearward edges 76 and 77 of the side-pieces 69 and 70 a predetermined distance so that only restricted movement of the truss 68 relative to the vertical plates 56 of the hitch connector 30 and disk attachment 12 is permitted.

When the disk attachment 12 is connected to the plow 11 in operative or plowing condition, the beam 60 and brace 63 are secured to the support 17 of the plow 11 and the beam 60 is directed outwardly from the plow toward the furrow side. The truss 68 is connected to the spaced beam hinges 74 and 75, and extends rearwardly therefrom in a spaced relation with the ground, the rear ends 76 and 77 of the side-pieces 69 and 70 of the truss being hingedly connected to the vertical plates 56 of the hitch connector 30. Inasmuch as the plow 11 may be angularly positioned in the ground because of the variations in penetration, the beam 60 may slope downwardly toward its right end 66 thereby causing the truss 68 to be tilted. As seen above, the hitch connector 30 provides the adjustment means for compensating for the tilt in the truss 68 so that the main frame 25 of the disk attachment 12 will be substantially level. When the plow 11 has been connected, preferably through the hydraulic lifting arrangement 14, to the prime mover 10, the improved plowing device is ready for operation.

It is now apparent that the plow 11 is secured in trailing relation to the prime mover 10, which defines a rectilinear path of movement during the plowing operation so that the land side furrow cut by the plow 11 will be substantially straight. The disk attachment 12 will be positioned to the right of the plow 11, and the front gang disks 27 will be behind the rear disk blade 20 or the moldboard of the plow 11. Furthermore, the rigid truss 68 and beam 60 will prevent lateral movement of the disk attachment 12 relative to the plow 11, although the truss and the disk attachment are free for vertical movement to compensate for rocks or the like which may be brought to the surface during plowing. When any large pieces or lumps of soil are encountered by the disks 27 in the front gang 26, the disk attachment 12 may pivot vertically on the truss 68 whereby the entire weight of the main frame 25 will exert a force directly on the lumps causing them to be broken up and displaced for further engagement by the disks 29 in the rear gang 28.

When it is desired to move the plow 11 and the disk attachment 12 from a plowed area to an unplowed area or to the housing area of a farm for storage, the hydraulic lifting mechanism 14 may be actuated to raise the plow 11 relative to the ground so the disks or share of the plow will be disengaged therefrom. As the plow is raised, its support 17 will carry the hitch beam 60 upwardly with it thereby causing the forward ends 72 and 73 of the side-pieces 69 and 70 to be pivoted on the hinges 74 and 75, and the rear ends 76 and 77 of the side-pieces 69 and 70 to be pivoted on the bolts 58 so that the truss will be angularly positioned relative to the ground. After a predetermined pivotal movement, the rear ends 76 and 77 will engage the abutments 81 of the vertical plates 56 so as to prevent further pivotal movement between the truss 68 and the disk attachment 12. Further upward movement of the plow 11 will cause the beam 60 to move upwardly, and the force exerted through the now rigid truss 68 defines a lifting movement on the disk attachment 12 so that the disks will be raised relative to the ground. It is apparent that the weight of the disk attachment 12 will exert a counteracting force against this lifting movement so that the disks may not be raised off the ground, but the upward force will be sufficient to reduce their cutting action to a minimum.

When the plow and disk combination has been transported to the area desired to be plowed, the hydraulic lifting mechanism 14 may be actuated to lower the plow 11 into the ground. As the plow is lowered, it will carry the beam 60 downwardly with it thereby causing the forward disks 27 of the disk attachment 12 to be lowered relative to the ground and the normal downward force caused by the weight of the disk attachment to be exerted on the disks 27 and 29. It is apparent that as the beam is carried downwardly by the plow 11, the ends 76 and 77 of the truss side-pieces 69 and 70 will become unlocked or disengaged from the abutment 81 on the vertical plates 56 so that the disk attachment 12 will be free to pivot vertically relative to the ground.

During the plowing operation, the three gang disk plow shown in Fig. 1 will be caused to move in rectilinear direction by the prime mover 10 so that the land side edges of the disk blades 18, 19 and 20 will be caused to rotate and bite into the unplowed ground. As seen hereinbefore, the depth of the blades is regulated by the ground wheel 21. As the freshly turned earth falls from the blades of the plow 11, the front gangs of disks 26 will be moved into contact therewith, and subsequently the rear gang of disks 28 will come into contact with the earth. As previously described, the disks 27 in the front gang 26 are concavely dished toward the land side of the disk attachment so that as the freshly turned earth is contacted by them it will simultaneously be pulverized and displaced to the left. Furthermore, the disks 29 in the rear gang 28 are concavely dished toward the furrow side so that the earth acted upon by the front gang 26 will be further cut up and displaced to the right. Inasmuch as the rear gang 28 is offset to the left from the front gang 26, the earth thrown to the left by the front gang will be replaced by the rear gang 28 thereby filling the furrow made by the outer furrow side disk 27 in the front gang 26. It is to be understood that the beam 60 is mounted a predetermined distance above the ground so that it will not interfere with the earth being turned by the disk blades 18, 19 and 20. The main frame 25 of the disk attachment 12 is also spaced above the disks 27 and 29 in the front and rear gangs 26 and 28 so that it will not obstruct the displacement of the freshly turned earth by the cutting action of the disks.

It is now obvious that the combination of and co-action between the disk attachment 12 and the plow 11 presents a novel arrangement for greatly improved farm plowing whereby the soil acted on will be pulverized for maximum moisture retention, and the surface left will be substantially level and ready for final preparation preparatory to planting.

This invention is intended to cover all changes and modifications of the example of the invention herein chosen for the purposes of disclosure, which do not constitute departures from the spirit and the scope of the invention.

What I claim is:

1. In combination, a disk attachment adapted to be attached to a plow, said disk attachment comprising a frame, a plurality of disks forming a front and a rear gang angularly positioned in the frame; a hitch connector having a first cross bar mounted on said frame, a second cross bar pivotally connected to said first cross bar with means for securing said cross bars in angularly adjusted position extending therebetween; and a hitch having a beam adapted to be secured to the plow, a truss hingedly connected to said beam and to said second cross bar of said hitch connector, and means between said truss and said second cross bar for restricting movement therebetween.

2. In combination, a disk attachment for simultaneous use with a plow connected to a prime mover and adapted to be drawn in a rectilinear path parallel with and laterally disposed from the path of the plow, said disk attachment comprising a frame and angularly positioned offset front and rear gangs of disks mounted in said frame; and a hitch comprising a beam having one end adapted to be secured to the plow to extend transversely of the path of movement of said disk attachment, said beam having spaced hinges mounted adjacent to the other end thereof, a hitch connector mounted on the front of said frame of said disk attachment including cross bars connected by a centrally positioned pivot pin, said cross bars having arcuate slots laterally of said pivot pin and bolts extending through said slots for adjustably securing said cross bars in fixed laterally angular relationship, the ends of one of said cross bars carrying vertical plates having vertically aligned openings therein, and a truss including interconnected spaced-apart longitudinal side pieces having forward ends connected to said hinges on said beam, said side pieces having rearward ends hingedly connected to the vertical plates on said one cross bar, the rearward ends of said side pieces being adjacent to said cross bar in position to contact and limit the movement between said truss and said disk attachment.

References Cited in the file of this patent

UNITED STATES PATENTS

| | | |
|---|---|---|
| 819,733 | Crisler | May 8, 1906 |
| 1,225,400 | Black | May 8, 1917 |
| 1,552,426 | Fall | Sept. 8, 1925 |
| 2,270,207 | Lindgren | Jan. 13, 1942 |
| 2,274,767 | Zink et al. | Mar. 3, 1942 |
| 2,499,988 | Cox | Mar. 7, 1950 |
| 2,708,333 | Cooney | May 17, 1955 |